(12) United States Patent
Coley

(10) Patent No.: US 7,832,427 B2
(45) Date of Patent: Nov. 16, 2010

(54) CONTROL VALVE ARRANGEMENTS

(75) Inventor: David Coley, West Midlands (GB)

(73) Assignee: Aldridge Piling Equipment (Hire) Co. Ltd., Staffordshire (GB)

(*) Notice: Subject to any disclaimer, the term of this patent is extended or adjusted under 35 U.S.C. 154(b) by 1297 days.

(21) Appl. No.: 10/543,581

(22) PCT Filed: Jan. 19, 2004

(86) PCT No.: PCT/GB2004/000154

§ 371 (c)(1),
(2), (4) Date: Oct. 25, 2005

(87) PCT Pub. No.: WO2004/068009

PCT Pub. Date: Aug. 12, 2004

(65) Prior Publication Data

US 2006/0118183 A1 Jun. 8, 2006

(30) Foreign Application Priority Data

Jan. 31, 2003 (GB) .................... 0302242.3

(51) Int. Cl.
*F15B 13/043* (2006.01)
*F15B 13/16* (2006.01)
*F16K 29/00* (2006.01)

(52) U.S. Cl. ............... 137/625.61; 137/625.64; 137/625.6; 91/365; 91/397

(58) Field of Classification Search .......... 137/625.6, 137/625.61, 625.66, 625.64; 91/365, 394, 91/397

See application file for complete search history.

(56) References Cited

U.S. PATENT DOCUMENTS

| | | | | |
|---|---|---|---|---|
| 528,933 | A * | 11/1894 | Fowler | 137/625.64 |
| 2,727,691 | A * | 12/1955 | Alyea et al. | 137/625.6 |
| 3,106,224 | A * | 10/1963 | Norman et al. | 137/625.63 |
| 3,162,093 | A * | 12/1964 | Zoller | 137/625.6 |
| 3,511,133 | A * | 5/1970 | Day | 91/394 |
| 3,665,807 | A * | 5/1972 | Bartholomaus et al. | 91/35 |
| 3,978,769 | A * | 9/1976 | Day | 91/358 A |
| 4,545,409 | A * | 10/1985 | Luhmer | 137/625.64 |
| 4,683,915 | A * | 8/1987 | Sloate | 137/625.63 |
| 6,470,913 | B1 | 10/2002 | Woodworth | |
| 2004/0035288 | A1* | 2/2004 | Hawthorne | 91/394 |
| 2004/0094028 | A1* | 5/2004 | Sheard et al. | 91/394 |
| 2005/0126386 | A1* | 6/2005 | Lin et al. | 91/394 |

FOREIGN PATENT DOCUMENTS

| | | |
|---|---|---|
| AU | 422904 | 4/1972 |
| CH | 600219 | 6/1978 |
| EP | 0 628 753 | 12/1994 |
| JP | 63312577 | 12/1988 |

* cited by examiner

*Primary Examiner*—John Rivell
(74) *Attorney, Agent, or Firm*—Chernoff, Vilhauer, McClung & Stenzel

(57) ABSTRACT

A valve arrangement includes a valve member, which rotates continuously in one sense. The generally cylindrical head of the valve member, within the housing, is formed to co-operate with various ports to create reciprocation in the actuator. It is preferred to provide some vibration of the valve member, to assist in overcoming the effects of friction.

25 Claims, 5 Drawing Sheets

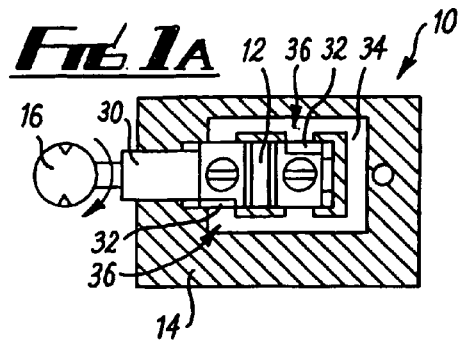
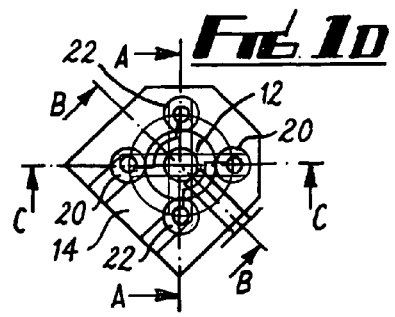
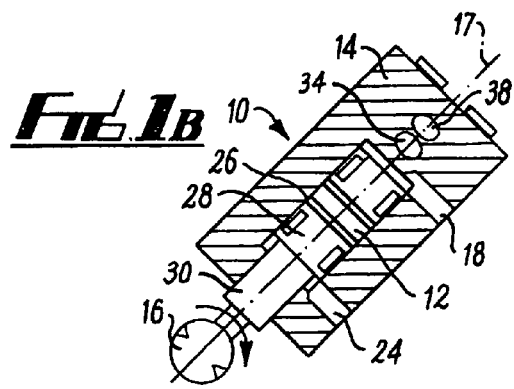
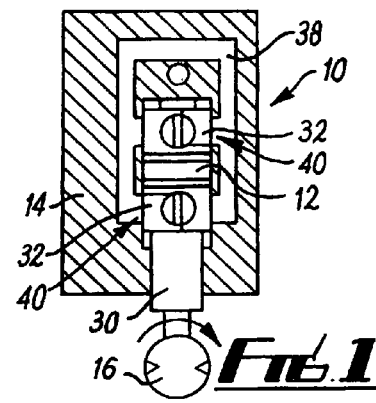
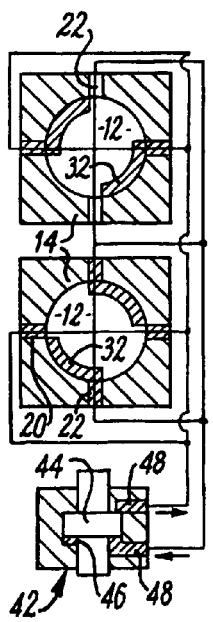
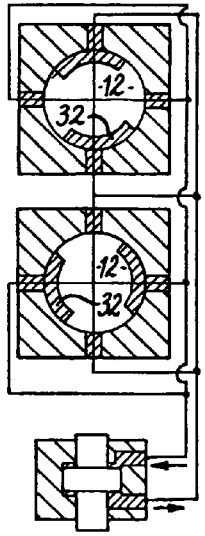
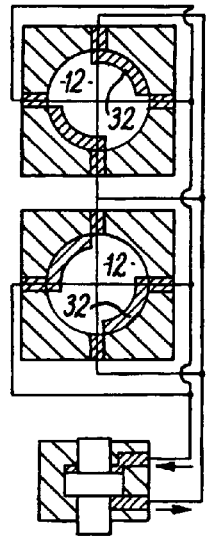
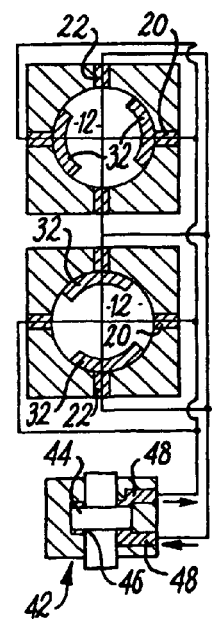

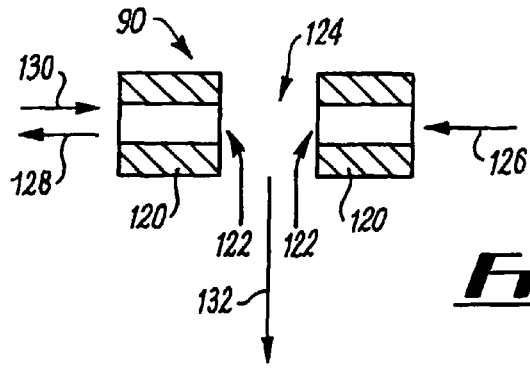
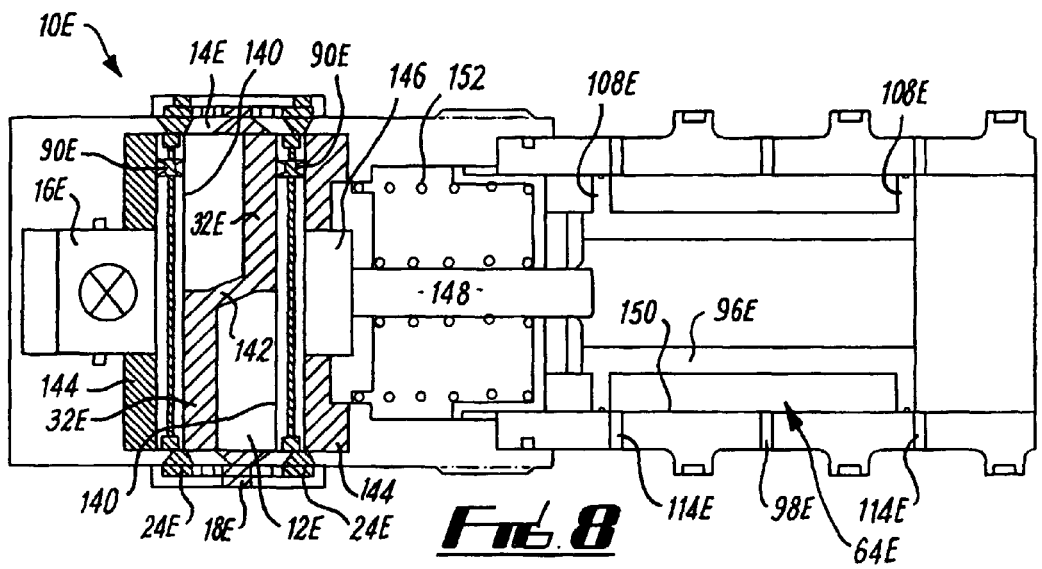
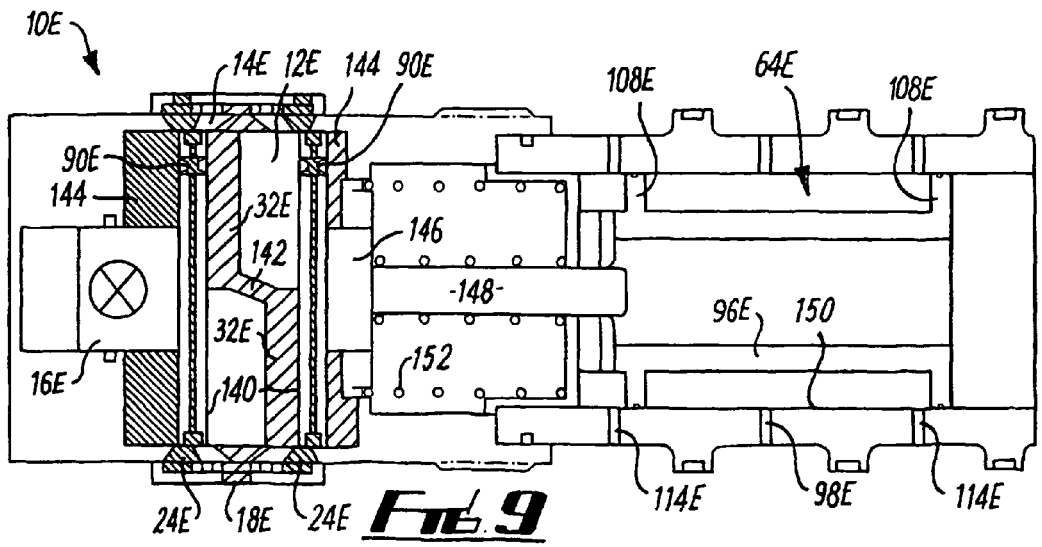

CONTROL VALVE ARRANGEMENTS

This is a national stage application filed under 35 USC 371 based on International Application No. PCT/GB 2004/000154 filed Jan. 19, 2004, and claims priority under 35 USC 119 of United Kingdom Patent Application No. 0302242.3 filed Jan. 31, 2003.

The present invention relates to control valve arrangements and in particular, but not exclusively, valve arrangements for controlling an actuator to cause the actuator to execute a predetermined sequence of operations.

The present invention provides a control valve arrangement comprising a valve member, a housing within which the valve member is mounted for continuous rotation in one sense, the housing having at least one port for receiving pressurised working fluid from a supply, at least one port for returning fluid to the supply, at least one port for providing pressurised fluid to an actuator, and at least one port for receiving returned fluid from the actuator, the housing and the valve member cooperating to define valve chambers therebetween, which change the connections between the ports as the valve member rotates, thereby operating the actuator, and the valve further comprising vibration means operable to cause vibration of the valve member to counteract friction between surfaces of the valve member and the housing.

Preferably the vibration means causes axial vibration of the valve member. The vibration means may be operable to cause vibration and to apply the vibration to the valve member. Alternatively, the vibration means may be provided by a portion of the valve member formed to weight the valve member eccentrically so that the valve member is caused to vibrate as it rotates.

The invention also provides a control valve arrangement for providing pressurised working fluid to an actuator and for receiving returned fluid from the actuator, the arrangement comprising first valve means operable to connect a supply of pressurised working fluid to a plurality of inlets of the actuator in accordance with a pre-arranged sequence, second valve means operable to provide a connection to the actuator in accordance with a second pre-arranged sequence, to pass returned fluid from the actuator to the supply, and wherein the second valve means is controlled by working fluid supplied by the first valve means.

Preferably the first valve is a rotary valve. The second valve means may be a spool valve. Preferably the spool valve has first and second positions which connect the actuator to vent respective chambers of the actuator. The spool valve is preferably driven between its positions by the pressurised working fluid being supplied to the actuator. There may be delay means operable to delay the supply of working fluid from the first valve to the actuator, to allow the working fluid to change the position of the spool valve before working fluid reaches the actuator. Feedback means are preferably provided, which act to correct excessive movement of the actuator. The feedback means may include a vent valve operable to vent working fluid from the actuator in the event of excessive movement, the vented working fluid being provided to control the first valve means to correct the excess of movement. The feedback means may comprise an accumulator to which working fluid is forced by excessive movement, thereby resisting the said excessive movement.

In a third aspect, the invention provides a control arrangement for providing working fluid to an actuator and for receiving return fluid from the actuator, the arrangement comprising first valve means operable to connect and disconnect a supply of pressurised working fluid to a plurality of ports of an actuator to effect a working sequence of the actuator, and second valve means operable to connect the supply to the first valve means to provide pilot pressure controlling the state of the first valve means, thereby controlling the working sequence of the actuator.

The first valve means is preferably a spool valve having a spool position controlled by the second valve means. The second valve means may be a rotary valve. Preferably the rotary valve is in accordance with the first aspect of the invention as set out above.

The rotary valve preferably creates reciprocatory movement as it rotates, the reciprocating member and spool of the first valve means being connected together to reciprocate together. The rotary valve may comprise a rotary valve member which is caused to reciprocate axially as it rotates. The rotary valve member and spool may be connected by a common shaft.

Feedback means are preferably provided, which act to correct excessive movement of the actuator. The feedback means may include a vent valve operable to vent working fluid from the actuator in the event of excessive movement, the vented working fluid being provided to correct excessive movement of the first valve means. The feedback means may comprise an accumulator to which working fluid is forced by excessive movement, thereby resisting the said movement.

Examples of the present invention will now be described in more detail, by way of example only, and with reference to the accompanying drawings, in which:

FIG. 1 is a schematic view of an actuator valve, with FIGS. 1A, 1B and 1C being sections along the lines A-A, B-B and C-C, respectively, in FIG. 1D;

FIG. 2 is a schematic diagram of a sequence of operation of the valve of FIG. 1;

FIG. 7 is a simple diagram of a jet valve for use in the alternative of FIGS. 6A, 6B, 8 and 9; and FIGS. 8 and 9 are schematic sections through a further example having an integrated rotary and spool valve.

FIG. 1 shows a control valve for use, for example, for controlling the supply of pressurised fluid to an actuator in order to cause the actuator to execute a predetermined sequence for creating driving forces.

Figure 3:
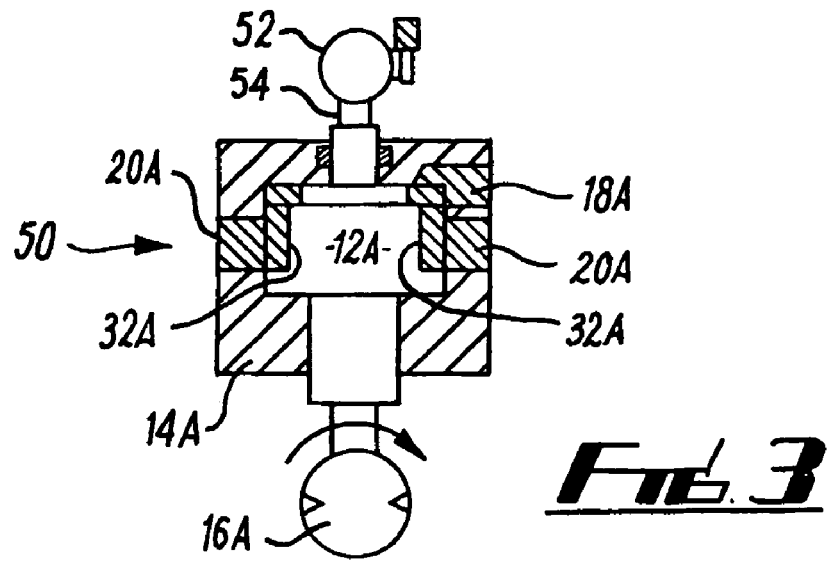
FIGS. 3 and 4 are diagrammatic views of modified valves.

The valve 10 includes a valve member 12 which is mounted within a housing 14 and driven by a motor 16 to rotate continuously in one sense about its axis 17. The housing has a port 18 for receiving pressurised working fluid from a supply (not shown). Ports 20, 22 provide connections between the valve 10 and an actuator (not shown), each acting either to provide pressurised fluid to the actuator, or to receive return fluid from the actuator, according to the position of the member 12. A further port 24 returns fluid from the valve 10 to the supply.

The member 12 is located within a chamber 26 within the housing 14. The member 12 has a generally cylindrical head 28 coupled by a shaft 30 to the motor 16. The head 28 has a pair of cut away regions 32 at each of the opposite ends of the head 28. A first plenum is formed within the body of the housing 14 and communicates with the first ports 20. Valve ports 36 of the plenum 34 are opened or closed by the head 28 and the regions 32, as the member 12 rotates. When in communication with the regions 32, the ports 36 are alternately connected to the pressure port 18 and return port 24.

Similarly, a second plenum 38 is provided in communication with the second ports 22 and having valve ports 40 which are opened and closed by the head 28 and regions 32. When in communication with the regions 32, the ports 40 are alternately connected to the pressure port 18 and return port 24.

The effect of the valve 10 is illustrated in FIGS. 2a to 2d, which are schematic diagrams showing an upper view which illustrates the connections made by the first of the regions 32, a middle view showing the connections made by the other region 32, and a lower view showing the effect on an actuator 42. The actuator is a simple piston actuator having a head 44 moving in a cavity 46 to which pressurised fluid can be applied selectively through ports 48 to push the head 44 in either direction, the other of the ports 48 being vented.

The sequence of operation illustrated in FIGS. 2a to 2d is set out only by way of example and shows a sequence appropriate to an actuator of the type illustrated. Other sequences could be provided either for the actuator 42 or for an alternative actuator design.

FIG. 2a shows the initial condition in which the pressure port 18 is connected through the lower region 32 to the ports 20 to provide pressurised working fluid (pneumatic or hydraulic) to raise the actuator head 44. Return fluid is connected through the ports 22 and the upper region 32 to the return port 24.

As the member 12 rotates (in the clockwise direction as shown in the drawings), the position of FIG. 2b is reached, in which the pressure port 18 is connected through the lower region 32 to the ports 22 and then to the actuator 42 above the head 44, causing the actuator 42 to be driven down. A return path is provided from the other (lower) face of the head 44 through the ports 20 and the upper region 32, to the return port 24. Further clockwise rotation of the member 12 reaches the position of FIG. 2C in which connections are as described in relation to FIG. 2b, but with the various connections being about to close. These close as rotation continues, opening a fresh set of connections as shown in FIG. 2d. In this position, the pressure port 18 is connected through the lower region 32 to the ports 20 to apply pressure below the actuator head 44 to cause the actuator to rise. A return path from above the head 44 is provided to the ports 22 and through the upper region 32 to the return port 24.

Further rotation of the member 12 returns the valve to the position of FIG. 2a, with the connections described in relation to FIG. 2d being near to closing. It is apparent from considering these drawings that the positioning of the regions 32 diametrically opposite each other provides a 180° rotational symmetry, so that the sequence described above is executed twice during each complete rotation of the member 12.

It can be understood from FIGS. 1 and 2 that one pair of the regions 32 communicates with the pressure port 18 but not the return port 24, whereas the other pair of regions 32 communicate with the return port 24, but not with the pressure port 18. Thus, the route for pressurised fluid through the valve 10 is kept separate from the route for return fluid through the valve 10 and this assists in achieving adequate sealing between the two routes, to prevent leakage from the pressure path to the return path, through the valve 10.

Reference has been made above to the separation of the pressure and return paths within the valve 10, and that this facilitates sealing between them. Precision machining and an appropriate choice of materials, such as ceramics, is expected to allow adequate sealing to be provided. However, both factors tend to increase the cost of the valve 10. This is partly offset by the use of pairs of ports 20, 22 to allow the overall size of the valve 10 to be reduced without affecting the power delivered to the actuator 42. This reduction in size reduces the material and machining costs. However, the use of precision machining in order to improve sealing has a tendency to create frictional effects between adjacent surfaces within the valve 10, particularly between the member 12 and the housing 14. These effects can interfere with the performance of the valve 10, particularly by increasing the power required of the motor 16, or preventing the member 12 rotating smoothly.

FIG. 3 illustrates schematically and in simplified form a modification to the arrangements of FIGS. 1 and 2, to reduce the effects of friction. FIG. 3 shows a valve 50 which may be as shown as described in relation to FIGS. 1 and 2, but is shown in FIG. 3 as a simplified form having a single pressure port 18A and a member 12A controlling pressure to ports 20A. The member 12A is driven by a motor 16A. The member 12A is partially cut away at 32A to connect the port 18A intermittently to the ports 20A. A second motor 52 is provided, connected to the member 12A by a shaft 54. The motor 52 is a low power motor, relative to the motor 16A and applies a reciprocating force axially along the member 12A, causing axial vibration of the member 12A as it rotates. This continuous vibration, the amplitude of which can be extremely small, serves to prevent the member 12A being at rest within the housing 14A and thus helps avoid friction causing the member 12A to stick within the housing 14A.

Figure 4:
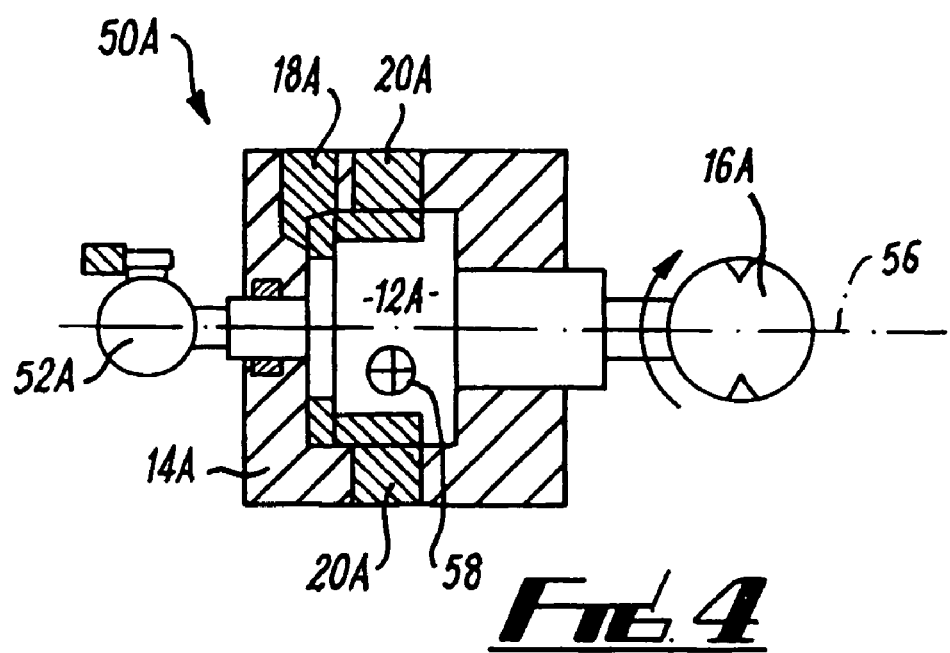

FIG. 4 shows a further alternative for reducing the effect of friction within the valve 50A. In this example, the orientation of the valve 50A is significant. The rotation axis 56 of the member 12A is shown as approximately horizontal. The shape and dimensions of the components may be the same as illustrated in FIG. 3 but in the arrangement of FIG. 4, the member 12 is formed to have a centre of gravity which is eccentric, i.e. not located at the axis 56. In FIG. 4, a centre of gravity is indicated at 58.

The eccentric weighting of the member 12A causes vibration as the member 12A rotates. This vibration will be generally transverse to the axis 56. Again, the vibration tends to disturb any friction effects which might otherwise arise between the member 12A and the housing 14A.

A vibration motor 52A can also be used to create axial vibration in the arrangement of FIG. 4, as described in relation to FIG. 3.

In the examples discussed above, the valves 10, 10A are rotary valves connected directly to the actuator and controlling the supply of pressurised working fluid to the actuator, and also controlling the return of working fluid from the actuator. The next examples show arrangements in which a rotary valve is connected directly to an actuator to control the supply of pressurised working fluid, but does not cooperate in the return path for working fluid.

Figure 5A:
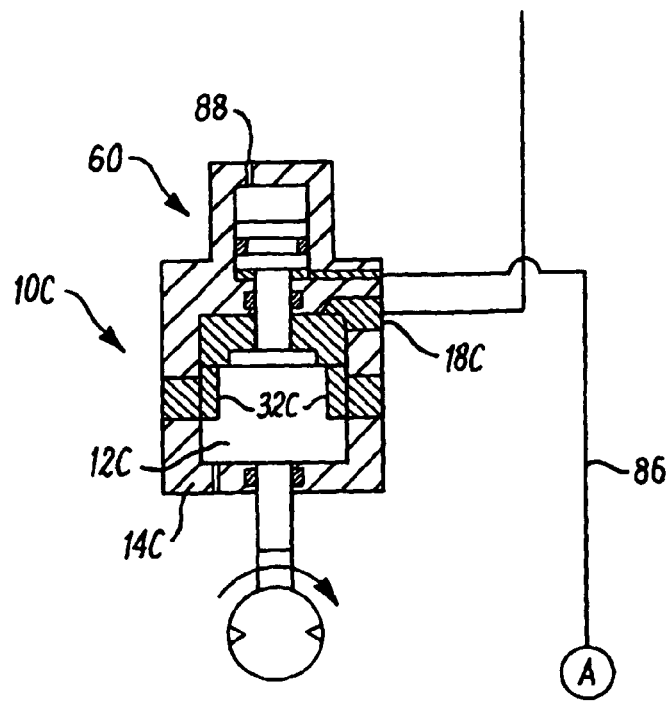
FIGS. 5A and 5B and FIGS. 6A and 6B illustrate alternatives using a rotary valve and a spool valve.

FIG. 5a illustrates a valve 10C which is a rotary valve based around a member 12C in a housing 14C acting generally as described in relation to FIG. 3 to connect a pressure port 18C to ports 20C or 22C, alternately. The ports of each pair of ports 20C, 22C are diametrically located relative to the member 12, as can be seen from FIG. 5b. The member 12C has two cut away regions 32C so that either both ports 20C or both ports 22C are connected to the pressure port 18.

A control actuator 60 in the form of a piston actuator is provided within the housing 14C to control the axial position of the member 12C within the housing 14C. This has the effect of varying the effective area of the ports 20C, 22C as can readily be appreciated from consideration of FIG. 5a, so that the actuator 60 controls the pressure supplied to the main actuator 42C. Supply from the ports 20C, 22C to the main actuator 42C is by hydraulic or pneumatic lines 62. The ports 20C provide pressure to one side of the actuator head 44, pressure to the other side being provided through the ports 22C, to create drive in opposite directions.

When one of the pairs of ports 20C, 22C is providing pressurised working fluid, the other pair of ports is closed and consequently, working fluid cannot return through the valve 10C. The return of working fluid is controlled by a spool valve 64 illustrated schematically in FIG. 5b. The spool valve 64 has two positions. In the position shown, a return path is provided from the right hand chamber (as viewed in FIG. 5a) of the actuator 42C to a sump 66 from which working fluid may be drawn for pressurisation and re-use. The left hand chamber of the actuator 42C is closed by the valve 64.

Figure 5B:
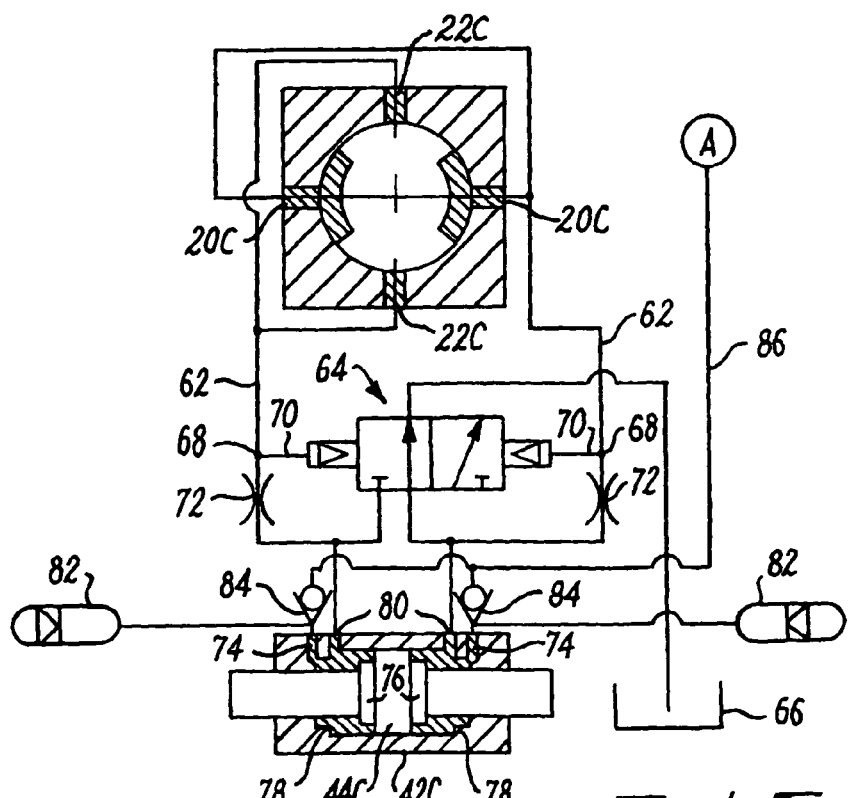

In the alternative position of the valve 64, as indicated by the conventional hydraulic symbols used in FIG. 5b, the left hand chamber of the actuator 42C is connected to the sump 66, while the right hand chamber is closed by the valve 64.

Consequently, when both valves are in the condition illustrated in FIG. 5b, pressurised working fluid is provided from the ports 20C of the valve 10C, to the right hand chamber of the actuator 42C, causing movement of the head 44C to the left, as viewed in FIG. 5b. The left hand chamber of the actuator 42C is emptied to the sump 66 by this movement, through the valve 64.

As the member 12C turns through 90°, and with the spool valve 64 in the alternative position (as will be described), pressurised fluid is provided from the valve 10C through the ports 22C to the left hand chamber of the actuator 42C. The right hand chamber is vented through the valve 64 to the sump 66.

In the example shown in FIG. 5b, the lines 62 from the ports 20C and 22C are both tapped at 68 to provide pilot pressure at 70 to control the position of the spool valve 64. Thus, pressure in the line 62 from the ports 20C tends to move the valve 64 from the position shown in FIG. 5b to the alternative position, whereas pressure in the line 62 from the ports 22C tends to move the valve 64 from the alternative position to the position shown in FIG. 5b. Thus, each time the valve 10C changes to reverse the pressure supply to the actuator 42C, the spool valve 64 is also caused to change state by virtue of the pilot pressure at 70. In an alternative arrangement, one direction of movement of the spool valve 64 may be created mechanically or manually. For example, the spool valve may be mechanically or manually moved to a position which retracts the actuator, and move by pressure to a position which drives the actuator.

The lines 62 are constricted at 72, downstream of the taps 68, to create a delay between the instigation of movement of the spool valve 64, and movement of the actuator 42C. This ensures that the valve 64 has been able to change state before working fluid begins to be forced from the actuator 42C.

When the arrangements described are correctly set up and functioning correctly, the actuator 42C will execute symmetrical oscillations about a centre position. However, in practice, wear, leaks or other factors may cause the actuator head 44 to drift toward one end or the other of the actuator 42C. FIG. 5b illustrates two alternative feedback arrangements to seek to control this drift and return the head 44C to a centred oscillation. It is to be understood that in practice, only one or other alternative would normally be required.

Both alternatives make use of a second vent 74 at each end of the actuator 42C. The head 44C carries collars 76 to either side, which cooperate with steps 78 in the walls of the actuator cavity so that as the head 44C approaches one end of the cavity, the corresponding principal vent 80 is closed, but continued movement in the same direction will continue to force working fluid from the second vent 74, by the action of the collar 76. Thus, until the vent 80 is closed, generally unrestricted venting of the working fluid is available through the valve 64 to the sump 66 but thereafter, the second vent 74 comes into use.

In the first alternative, the second vents 74 are each connected directly to a respective accumulator 82 into which working fluid must be forced from the vent 74 against the pressure within the accumulator 82. Thus, the accumulator 82 serves as a form of pneumatic spring providing increasing resistance as the head 44C moves further toward the end of the actuator cavity. Thus, the accumulator 82 seeks to limit the approach of the head 44C to the end of the cavity, thus restoring the actuator oscillations to a centred position.

In the second alternative, the vents 74 are provided with non-return valves 84 through which the vents 74 are connected to a common return line 86 connected to one end of the control actuator 60, the other end being vented at 88. During normal operation of this alternative, working fluid leaving the actuator 42C will normally vent through the main vents 80, passing freely through the valve 64 to the sump 66. If the head 44C moves sufficiently to close the main vent 80, working fluid is then forced through the corresponding second vent 74, passing through the valve 84, along the return line 86 and into the control actuator 60, which causes pressure to increase within the actuator 60, causing the actuator 60 to move the member 12C along its axis. This has the effect of restricting the ports 20C, 22C, to reduce the working pressure being applied to the actuator 42C and thus provides a feedback mechanism by which excessive movement of the head 44C is counteracted.

In a further alternative, not illustrated, the control actuator 60 can be used for a second purpose in addition to the feedback control which has just been described. This second purpose relates to an alternative construction of the valve 10C, in which the member 12C has several sets of regions 32C along its length, each serving to create a different operating sequence in the actuator 42, so that the operating sequence being used can be changed by axial movement of the member 12C, to cause a different set of regions 32 to come into cooperation with the ports 20C, 22C. Thus, in this alternative, additional control lines are provided to allow pressure to be applied to the control actuator 60 to control the axial position of the member 12C, in addition to the feedback pressure received from the line 86, which provides a smaller feedback control pressure as described above.

Thus, it can be seen that in the example described in relation to FIG. 5, the rotary valve is directly connected to the actuator to provide pressurised working fluid, and also provides pilot pressure to control the spool valve, with the return path for working fluid being controlled by the spool valve, not the rotary valve.

Figure 6A:
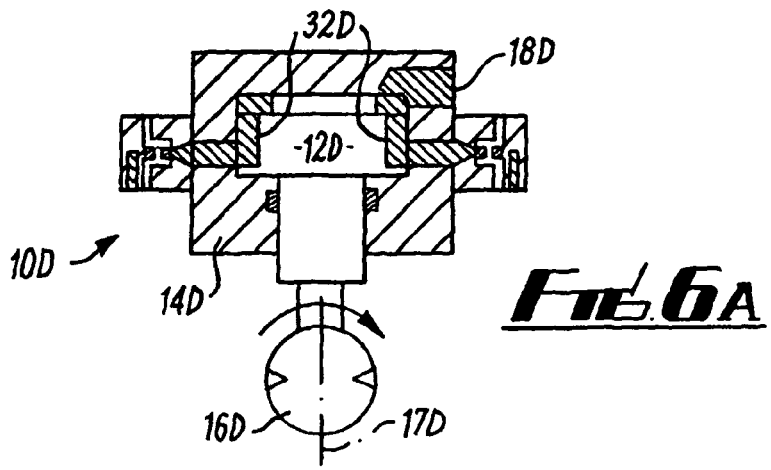
Figure 6B:
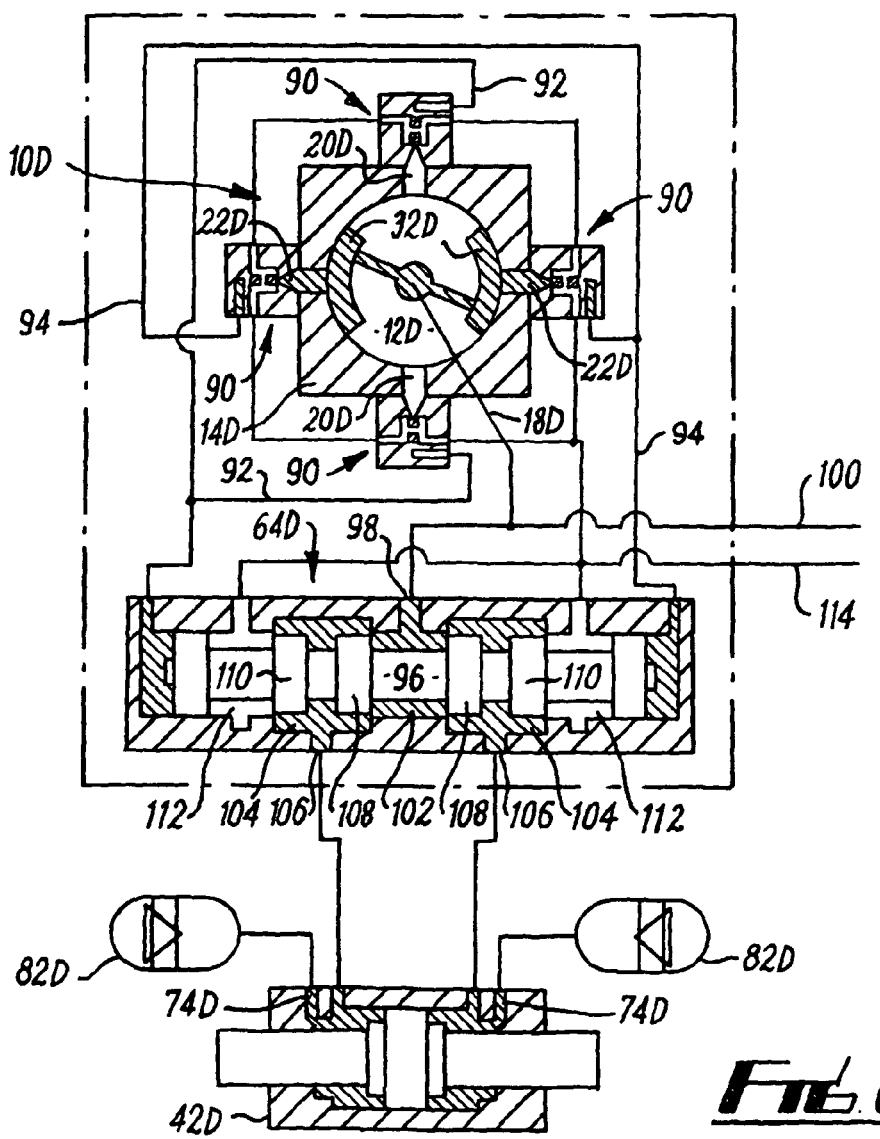

FIGS. 6a and 6b illustrate a further example in which a rotary valve 10D and spool valve 64D are both used to control an actuator 42D.

In this example, the valve 10D is shown in FIG. 6a, having a rotating member 12D within a housing 14D and driven to rotate continuously in one sense about its axis 17D by a motor 16D. Pressurised working fluid is received at a port 18D, which is connected through regions 32D to ports 20D and 22D, alternately.

In this example, the valve 10D is not connected directly to the actuator 42D, but is used only provide pilot pressure to the spool valve 64D. Specifically, the ports 20D are connected through jet devices 90, to be described, to lines 92 which meet to provide pilot pressure to the left hand end (as illustrated in FIG. 6b) of the spool valve 64D. Conversely, the ports 22D provide pressure through jets 90 to lines 94, which provide pressurised working fluid to the right band end of the valve 64D. Consequently, the valve alternately applies pilot pressure to opposite ends of the spool 96 of the valve 64D, causing the spool 96 to shuttle in alternate directions.

The spool 96 is shown in its mid position in FIG. 6b. A central port 98 receives pressurised working fluid from the supply at 100, to a chamber 102 around the spool 96. Neighbouring chambers 104 to either side of the chamber 102 communicate with respective exit ports 106 which are in turn connected with opposite ends of the actuator 42D. Communication between the chamber 102 and the chambers 104 is controlled by lands 108 on the spool 96. As the spool 96 shuttles back and forth, each land 108 moves into the chamber 102, closing it from the corresponding chamber 104, or moves into the corresponding chamber 104, clear of the chamber 102, allowing communication between the chamber 102 and the corresponding chamber 104. When communication with one of the chambers 104 is provided in this manner, communication with the other chamber 104 will be blocked by the other land 108. Consequently, oscillation of the spool 96 connects the chamber 102 alternately to the chambers 104 and thus causes the actuator 42D to reciprocate.

Second lands 110 provide control, in a similar manner, over communication from the chambers 104 to corresponding third chambers 112, positioned to either side of the chambers 104. Thus, the lands 110 can move into the third chambers 112 to close them from the corresponding chamber 104, or can move into the corresponding chamber 104, to provide communication with the corresponding third chamber 112. It can readily be understood from FIG. 6b, that when the spool 96 has moved to a position in which a land 108 has opened communication between the chamber 102 and the corresponding chamber 104, the corresponding land 110 will have moved to block communication from the corresponding chamber 104 to the corresponding chamber 112. Conversely, when communication between the chamber 102 and the corresponding chamber 104 is blocked, communication from the corresponding chamber 104 will be open with the corresponding third chamber 112. The third chambers 112 are both connected to the return line 114 for working fluid.

Operation of the valve 10 will alternately cause the spool 96 to move to the left or to the right as shown in FIG. 6b. When pressure is leaving the ports 20D of the valve 10D, to drive the spool 96 to the right, as shown in FIG. 6b, pressurised working fluid passes through the pressure port 98 and chamber 102 to the right hand chamber 104 and thus to the right hand end of the actuator 42D, driving the head 44D toward the left of FIG. 6b. When the valve 10D switches to provide pressurised working fluid through the ports 22D, the spool 96 is driven to the left, as shown in FIG. 6b, connecting the pressure port 98 through the chamber 102 to the left hand chamber 104 and thus to the left hand end of the actuator 42D, thus driving the head 44D toward the right of FIG. 6b. In an alternative arrangement, one direction of movement of the spool 96 may be created mechanically or manually.

It can thus be understood that in this example, the rotary valve 10D is not connected directly to the actuator 42D, but only supplies pilot pressure to the spool valve 64D. The spool valve 64D is connected directly to the actuator 42D and controls pressurised working fluid to the actuator 42, and also the return of working fluid from the actuator 42D.

Accumulators 82D are illustrated in FIG. 6b, connected through second vents 74D to the actuator 42D, to provide a feedback effect as described more fully in relation to FIG. 5b.

The rotary valve 10D of FIGS. 6a and 6b is shown as a simple valve provided a single working sequence and without axial movement. Alternatively, the member 12D could be axially movable to adjust pressure, as described above in relation to FIG. 5a. Alternatively, the member 12D could be movable between several axial positions which allow the working sequence to be changed, again as described above in relation to FIG. 5a.

The jet arrangements go shown in FIGS. 6a and 6b can be understood more clearly by reference to FIG. 7, which is a highly simplified schematic diagram of one jet 90. The jet go has two heads 120 which each have a nozzle 122. The nozzles 122 face each other but are separated by a gap at 124. In the example of FIG. 7, pressurised fluid is normally supplied from the direction of the arrow 126. Under sufficient pressure, as when the supply is from the main pressurised working fluid supply, the nozzle 122 will create a jet of working fluid which will cross the gap 124 and enter the other nozzle 122 to leave the jet 90 as indicated by the arrow 128, and still under pressure. If working fluid subsequently returns in the direction 130 and not under pressure, the pressure will be insufficient to cause the fluid to cross the gap 124 and the fluid will fall, as indicated at 132, to be conveyed away for re-use. Thus, the jet go forms a form of valve which will allow working fluid to pass when under full pressure, but will reject fluid at return pressure. Thus, in the arrangement of FIG. 6b, returned fluid being driven from the ends of the spool 96 will encounter the jets go and, rather than being forced into the ports 20D, 22D, will fall away to the return line 114.

In the next example, shown in FIG. 8, a rotary valve is again used to provide pilot pressure to a spool valve, as in the example illustrated in FIGS. 6a and 6b, with the spool valve being connected directly to the actuator to control pressure and return paths. However, the example of FIG. 8 shows the rotary valve physically integrated with the spool valve, as will now be described.

In FIG. 8, a rotary valve 10E is provided, based around a rotating member 12E within a housing 14E and driven by a motor 16E. A pressure port 18E connects the valve 10E to the supply of pressurised working fluid. Return ports 24E ultimately drain the valve 10E. Within the valve 10E, the member 12E is in the form of a disc rotating about its centre and having two circular faces 140, each partially cut away to provide a region 32E, the regions 32E being generally diametrically opposite each other and on opposite faces 140. A connecting bore 142 is provided through the body of the member 12A, between the regions 32E. As the disc 12E rotates, the pressure port 18E will remain in communication with the regions 32E, through the circumferential passage 143. The regions 32E will, alternately, be in communication through a respective jet 90E with chambers 144 to either side of the member 12E. The jets 90E are of the form described in relation to FIG. 7 and can either pass pressurised working fluid from the corresponding region 32E across to the corresponding chamber 144, or can return fluid from the chamber 144 to a corresponding return port 24E. Consequently, as the member 12E rotates, a first position is reached as shown in FIG. 8. The pressure port 18E communicates with the regions 32E, and then through the corresponding jet 90E to the chamber 144 to the right of the member 12E. This causes the member 12E to be driven to the left, as viewed in FIG. 8.

Upon further rotation, the position of FIG. 9 is reached, in which the pressure port 18 is in communication with the recesses 32E and pressure passes through the other jet 90E to the chamber 144 to the left of the member 12E, as shown in FIG. 9. This causes the member 12E to be driven to the right. Meanwhile, working fluid within the chamber 144 to the right of the member 12E can vent through the jet 90E to a return port 24E.

Consequently, rotation of the member 12E is converted into axial reciprocation.

The member 12E is connected by a head 146 and shaft 148 to a spool valve, generally at 64E and having a spool 96E carrying lands 108E. The spool 96E slides in a cylinder 150, having three sets of ports, namely a pressure port 98E, in communication with the supply of pressurised working fluid, and two ports 114E. The spool 96E interconnects the various ports either as shown in FIG. 8, with the pressure port 98E in communication with the left hand ports 114E, and the right hand ports 114E vented to an appropriate return line, or to the position shown in FIG. 9, with the pressure port 98 in communication with the right hand ports 114E, and the left hand ports vented to an appropriate return line (not shown). Consequently, connection of the left hand ports and right hand ports 114E to corresponding sides of an actuator of the type described above will cause reciprocation of the actuator, as the spool valve 64E reciprocates.

Reciprocation, and the avoidance of friction within the system, may be assisted by the presence of springs 152.

Accordingly, in this example, rotation of the valve member 12E is turned into reciprocation of the member 12E, which in turn is mechanically connected to the spool 96E to control the spool valve 64E and thus execute the operating sequence of pressurised fluid to the actuator to which the arrangement is connected. In effect, the valve member 12E is serving to provide pilot pressure to cause axial movement of itself, which pilot pressure serves as pilot pressure for the spool 96E, because the valve member 12E and the spool 96E are mechanically connected.

It will be apparent that many variations and modifications can be made to the arrangements described above. In particular, various arrangements described in the examples are interchangeable. Axial vibration could be provided to any of the rotary valves, to assist in reducing friction. The number of ports on the valve could be varied. Feedback arrangements, such as those described, could be incorporated or omitted from various arrangements.

It is envisaged that these arrangements will be able to act to reverse very quickly the supply of working fluid, allowing actuators to be driven at frequencies which generate vibration, thus allowing vibrator devices to be driven.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control arrangement for providing working fluid to an actuator and for receiving return fluid from the actuator, the arrangement comprising first valve means operable to connect and disconnect a supply of pressurised working fluid to a plurality of ports of an actuator to effect a working sequence of the actuator, and second valve means operable to connect the supply to the first valve means to provide pilot pressure controlling the state of the first valve means, thereby controlling the working sequence of the actuator, and wherein pressurized fluid is supplied, in use, from the second valve means through a further valve means, said further valve means comprising first and second nozzles which face each other and are separated by a gap, wherein a jet of working fluid under working pressure, created by said first nozzle, crosses the gap, in use, to enter said second nozzle, and wherein working fluid not under working pressure, returning from said second nozzle is rejected from crossing said gap into said first nozzle.

2. An arrangement according to claim 1, wherein the first valve means is a spool valve having a spool position controlled by the second valve means.

3. An arrangement according to claim 1, wherein the second valve means is a rotary valve.

4. An arrangement according to claim 3, wherein the rotary valve comprises a valve member, a housing within which the valve member is mounted for continuous rotation in one sense, the housing having at least one port for receiving pressurised working fluid from a supply, at least one port for returning fluid to the supply, at least one port for providing pressurised fluid to an actuator, and at least one port for receiving returned fluid from the actuator, the housing and the valve member cooperating to define valve chambers therebetween, which change the connections between the ports as the valve member rotates, thereby operating the actuator, and the valve further comprising vibration means operable to cause vibration of the valve member to counteract friction between surfaces of the valve member and the housing.

5. An arrangement according to claim 3, wherein the rotary valve creates reciprocatory movement as it rotates, the reciprocating member and spool of the first valve means being connected together to reciprocate together.

6. An arrangement according to claim 3, wherein the rotary valve comprises a rotary valve member which is caused to reciprocate axially as it rotates.

7. An arrangement according to claim 3, wherein the rotary valve member and spool are connected by a common shaft.

8. An arrangement according to claim 1, wherein feedback means are provided, which act to correct excessive movement of the actuator.

9. An arrangement according to claim 8, wherein the feedback means includes a vent valve operable to vent working fluid from the actuator in the event of excessive movement, the vented working fluid being provided to correct excessive movement of the first valve means.

10. An arrangement according to claim 8, wherein the feedback means comprise an accumulator to which working fluid is forced by excessive movement, thereby resisting the said movement.

11. A control arrangement for providing working fluid to an actuator and for receiving return fluid from the actuator, the arrangement comprising first valve means operable to connect and disconnect a supply of pressurised working fluid to a plurality of ports of an actuator to effect a working sequence of the actuator, and second valve means operable to connect the supply to the first valve means to provide pilot pressure controlling the state of the first valve means, thereby controlling the working sequence of the actuator, wherein said second valve means is a rotary valve and is operable for continuous rotation in one sense.

12. An arrangement according to claim 11, wherein the first valve means is a spool valve having a spool position controlled by the second valve means.

13. An arrangement according to claim 11, wherein the rotary valve creates reciprocatory movement as it rotates, the reciprocating member and spool of the first valve means being connected together to reciprocate together.

14. An arrangement according to claim 11, wherein the rotary valve comprises a rotary valve member which is caused to reciprocate axially as it rotates.

15. An arrangement according to claim 11, wherein the rotary valve member and spool are connected by a common shaft.

16. An arrangement according to claim 11, wherein feedback means are provided, which act to correct excessive movement of the actuator.

17. An arrangement according to claim 16, wherein the feedback means includes a vent valve operable to vent working fluid from the actuator in the event of excessive movement, the vented working fluid being provided to correct excessive movement of the first valve means.

18. An arrangement according to claim 16, wherein the feedback means comprise an accumulator to which working fluid is forced by excessive movement, thereby resisting the said movement.

19. A control arrangement for providing working fluid to an actuator and for receiving return fluid from the actuator, the arrangement comprising first valve means having a spool, the first valve means operable by movement of the spool to connect and disconnect a supply of pressurised working fluid to a plurality of ports of an actuator to effect a working sequence of the actuator, and second valve means operable to connect the supply to the first valve means to provide pilot pressure controlling the state of the first valve means, thereby controlling the working sequence of the actuator, wherein said second valve means is a rotary valve having a rotary valve member, and said rotary valve creates reciprocatory movement of the rotary valve member as the rotary valve rotates, the reciprocating rotary valve member and said spool of the first valve means being connected together to reciprocate together, and wherein feedback means are provided, which act to correct excessive movement of the actuator.

20. An arrangement according to claim 19, wherein the first valve means is a spool valve having a spool position controlled by the second valve means.

21. An arrangement according to claim 19, wherein the rotary valve comprises a rotary valve member which is caused to reciprocate axially as it rotates.

22. An arrangement according to claim 19, wherein the rotary valve member and spool are connected by a common shaft.

23. An arrangement according to claim 19, wherein the feedback means includes a vent valve operable to vent working fluid from the actuator in the event of excessive movement, the vented working fluid being provided to correct excessive movement of the first valve means.

24. An arrangement according to claim 19, wherein the feedback means comprise an accumulator to which working fluid is forced by excessive movement, thereby resisting the said movement.

25. An arrangement according to claim 19, wherein the rotary valve is operable for continuous rotation in one sense.

* * * * *